(12) United States Patent
Hüttinger et al.

(10) Patent No.: US 7,719,192 B2
(45) Date of Patent: May 18, 2010

(54) METAL HALIDE LAMP WITH INTERMETAL INTERFACE GRADIENT

(75) Inventors: Roland Hüttinger, Kaufering (DE); Stefan Jüngst, Zorneding (DE); Khanh Pham Gia, Neubiberg (DE); Steffen Walter, Oberpframmern (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 63 days.

(21) Appl. No.: 12/086,079

(22) PCT Filed: Nov. 29, 2006

(86) PCT No.: PCT/EP2006/069052
§ 371 (c)(1),
(2), (4) Date: Jun. 5, 2008

(87) PCT Pub. No.: WO2007/065827
PCT Pub. Date: Jun. 14, 2007

(65) Prior Publication Data
US 2009/0039784 A1    Feb. 12, 2009

(30) Foreign Application Priority Data
Dec. 9, 2005    (DE) .................. 10 2005 058 897

(51) Int. Cl.
*H01J 17/18*    (2006.01)
*H01J 61/36*    (2006.01)

(52) U.S. Cl. .............. 313/623; 313/484; 313/491; 313/493; 313/631; 313/634; 445/26

(58) Field of Classification Search .............. 313/484, 313/491, 493, 567, 623, 625, 631, 634; 445/26, 445/27
See application file for complete search history.

(56) References Cited

U.S. PATENT DOCUMENTS

| 3,926,574 A | 12/1975 | Priceman |
| 4,001,625 A | 1/1977 | Schat et al. |
| 6,194,832 B1 * | 2/2001 | Juengst ................. 313/625 |
| 6,590,342 B1 | 7/2003 | Onnekes-Van Der Voort et al. |
| 6,774,547 B1 * | 8/2004 | Zaslavsky et al. .......... 313/285 |
| 2005/0073256 A1 * | 4/2005 | Jackson et al. ............ 313/634 |
| 2009/0134797 A1 * | 5/2009 | Spaniol .................. 313/626 |

FOREIGN PATENT DOCUMENTS

| DE | 102 20 735 A1 | 11/2003 |
| EP | 0 528 428 B1 | 1/1996 |
| EP | 0 764 970 A2 | 3/1997 |
| EP | 0 807 957 A2 | 11/1997 |

* cited by examiner

*Primary Examiner*—Joseph L Williams
*Assistant Examiner*—Kevin Quarterman

(57) ABSTRACT

The invention relates to a metal halide lamp comprising a ceramic discharge vessel (21), characterized in that a molybdenum leadthrough (11) is connected to a cermet stopper (15) via an intermetal interface gradient (20).

14 Claims, 2 Drawing Sheets

METAL HALIDE LAMP WITH INTERMETAL INTERFACE GRADIENT

TECHNICAL FIELD

The invention relates to a metal halide lamp in accordance with the precharacterizing clause of claim 1. The invention is concerned with lamps with a ceramic discharge vessel which are used in particular in general lighting.

PRIOR ART

A metal halide lamp is already known from U.S. Pat. No. 6,590,342. The leadthrough is sealed off by means of glass solder in a stopper. In order to adapt better to the coefficient of thermal expansion, a layer consisting of molybdenum aluminide, $Mo_3Al$, is applied to the leadthrough there. Other intermetallic components are also proposed for the layer.

The leadthrough is a pin, whose inner part consists of molybdenum. In this case, the layer also has the additional purpose of being particularly resistant to halogens in the filling.

DESCRIPTION OF THE INVENTION

The object of the present invention is to design the seal of the leadthrough to be as permanent as possible and to achieve improved adhesion between the leadthrough and the surrounding environment.

This object is achieved by the characterizing features of claim 1. Particularly advantageous configurations are provided in the dependent claims.

The sealing technology for high-pressure discharge lamps with a ceramic discharge vessel has not yet been satisfactorily resolved.

For the seal, molybdenum leadthroughs in the form of a tube or pin are now compressed centrally in a stopper consisting of a cermet, which in particular consists of proportions of Mo and $Al_2O_3$. Preferably, a tube is used since it has more elastic properties than a pin. The cermet comprises the two components approximately in a ratio of 50:50, in particular in a range of from 30:70 to 70:30. Then, this system is used in a discharge vessel consisting of transparent $Al_2O_3$ or the like. The connection of the cermet stopper to the $Al_2O_3$ inner wall of the end of the discharge vessel then takes place as is known via the addition of glass solder, which melts at approximately 1600° C. The glass solder provides a fixed interfacial joint.

On the other hand, the quality of the joint between the stopper and the leadthrough has been unsatisfactory with the previous technology because the joint between a metallic leadthrough, in particular a molybdenum tube, and a glass solder fails because of the inert molybdenum, which does not enter into a reaction with glass solder. There is therefore only a purely physical bond with a poor adhesive action between a molybdenum leadthrough and a glass solder. During constant temperature changes between the operating state and the switched-off lamp, cracks therefore form which ultimately result in a lack of sealtightness and therefore in lamp failure.

According to the invention, no glass solder or melt ceramic is now provided at this point. A better adhesive action of the Mo leadthrough in comparison with a stopper consisting of cermet is now achieved by activation of the surface of the leadthrough. By means of an alitization process, also referred to as an aluminum-coating process by means of spraying, aluminum is introduced reactively into the surface of the leadthrough consisting of molybdenum via the gas phase. In this case, at first an $Mo_3Al_8$ layer is formed on the outside.

This takes place in a diffusion process, which is temperature-dependent and time-dependent. For this purpose, in particular Mo tubes are positioned in an Al-containing powder bed mixture and annealed at temperatures of between 800 and 1200° C. in a protective gas atmosphere. A gradient microstructure comprising an Al-rich $Al_8Mo_3$ phase, which is adjoined further inwards by an Al-leaner phase, principally $Mo_3Al$, which on the inside becomes the pure Mo microstructure of the tube, is produced on the outside on the surface of the leadthrough. The aluminum from the outer phase near to the surface, predominantly initially an $Al_8Mo_3$ phase, is capable of entering into a reaction with the Mo of the stopper, which consists of Mo—$Al_2O_3$ cermet, and thereby providing a fixed joint between the stopper and the leadthrough by means of an adhesive layer, which contains Al and Mo at the same time. Depending on the procedure, in this case some of the Al and Mo in the adhesive layer is converted into a cermet consisting of Mo and $Al_2O_3$.

In this way, the adhesive strength of the interface between the Mo leadthrough and the cermet stopper is decisively improved.

The good adhesion is achieved as a result of the temporary formation of an intermetallic microstructure, which is formed as a gradient structure from the Mo base material of the leadthrough as far as into the cermet of the stopper. The formation of cracks, which until now have originated at the interface between the leadthrough/cermet stopper, is thereby markedly reduced.

The tube dimensions can be conventional, as represented, for example, in EP-A 528 428. A tube with a diameter of 0.5 to 3 mm is particularly preferred for the Mo leadthrough. The wall thickness is, for example, from 100 to 300 µm. The alitized tube is inserted into the stopper consisting of cermet and heat-treated, in particular at 1500 to 2000° C. Preferably, in this case a protective gas, namely an inert gas such as argon or nitrogen, is used.

The $Mo_3Al_8$ layer located on the outside on the leadthrough consisting of Mo or the $MO_3Al_8$ predominantly located there reacts at a high temperature with the oxygen on the surface of the cermet, with the result that the Al is converted into $Al_2O_3$ in this layer, an Al-leaner phase being produced from the original $Mo_3Al_8$. Ultimately, an $MO_3Al$ layer therefore results on the surface of the original $Mo_3Al_8$ layer, which $Mo_3Al$ layer is richer in Al in deeper layers. This $Mo_3Al$ forms, during its reaction, a toothed layer, which ensures particularly good adhesion. As it forms the $MO_3Al_8$ grows into the deeper layers of the Mo tube and also forms a toothed formation here whilst forming an $Mo_3Al$-rich layer. The reaction in the cermet stopper primarily proceeds on the surface of the larger grains of $Al_2O_3$, where the Al is very reactive.

Preferably, an inert gas/oxygen mixture is used for producing sufficient quantities of the reactive oxygen. The inert gas is a protective gas consisting of Ar and/or $N_2$. A procedure in which small quantities of oxygen are added to the protective gas is particularly effective. The oxygen partial pressure should be of the order of magnitude of from 20 to 200 ppm, in particular at most 100 ppm. If more oxygen is added, the molybdenum oxidizes on the surface to form $MoO_2$ or $MoO_3$. These substances are very volatile and are not suitable for improving the adhesion.

FIGURES

The invention will be explained in more detail below with reference to a plurality of exemplary embodiments. In the figures.

DESCRIPTION OF THE PREFERRED EMBODIMENT

Figure 1:
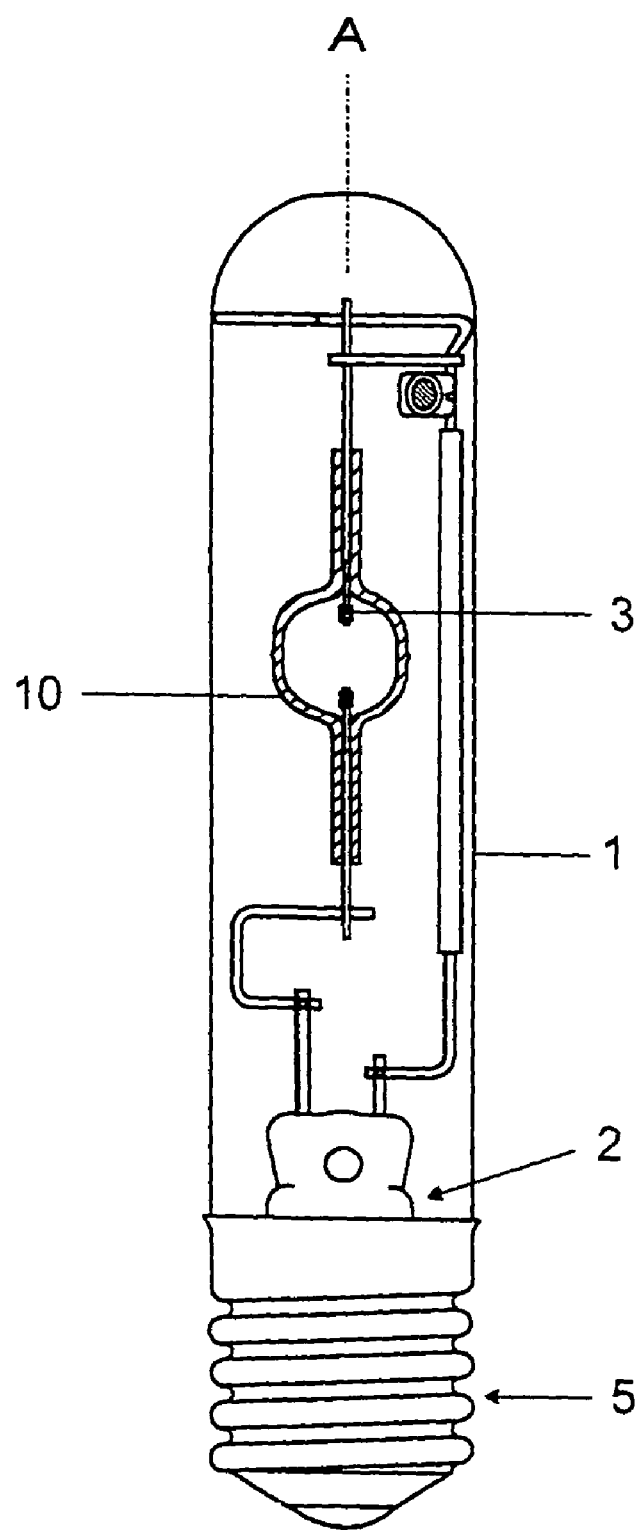
FIG. 1 shows a metal halide lamp, in section, schematically.

FIG. 1 shows a schematic of a metal halide lamp with an outer bulb 1 consisting of hard glass or quartz glass, which has a longitudinal axis and is sealed at one end by a plate-like fuse seal 2. Two power supply lines are passed out (not shown) at the plate-like fuse seal 2. They end in a base 5. A ceramic discharge vessel 10, which is sealed off at two ends, consists of $Al_2O_3$ and has a filling consisting of metal halides is inserted axially in the outer bulb.

The discharge vessel 10 can be cylindrical or internally spherical or elliptical. Electrodes 3, which are fixed to leadthroughs consisting of molybdenum, protrude into the discharge vessel. The leadthrough is preferably a tube, but may also be a pin. In particular, the leadthrough can also be in two parts, and only the front end of the leadthrough can consist of molybdenum.

An ignitable gas from the group of noble gases is located in the discharge vessel. Furthermore, a mixture of metal halides as are known per se, for example iodides of Na, Tl and Dy and possibly mercury, is located in the discharge vessel. Ca can also be used as a halide. The glass solder can contain, for example, $Al_2O_3$, $SiO_2$, $Dy_2O_3$ and/or MgO.

Figure 2:
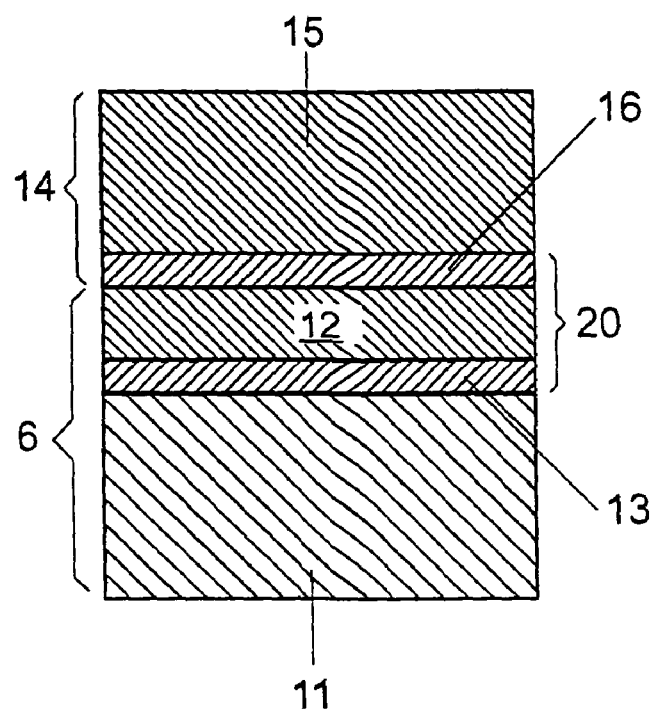
FIG. 2 shows an illustration of the joining mechanism, schematically.

FIG. 2 shows a schematic of the joint between the molybdenum tube and the cermet stopper in detail. In this case, the leadthrough 6 consisting of molybdenum is shown as a base material 11, with a thin layer 12 of $Al_8Mo_3$ being formed in the surface. This layer is formed by an alitization process. Under suitably selected reaction conditions, the aluminum diffuses into deeper layers of the leadthrough, with the result that a thin layer 13 of $AlMO_3$ is produced which is formed between the layer 16 consisting of $Al_8Mo_3$ and the base element 11 consisting of Mo. This layer sequence is achieved by the reactive diffusion of the aluminum into the surface of the molybdenum tube. The layer consisting of $Al_8Mo_3$ which is located on the surface of the leadthrough for its part reacts with the Mo proportion of the cermet stopper 14, which is preferably at approximately 50%, under heat treatment once it has been inserted into the stopper, with the result that first an $AlMo_3$ phase is now formed as a thin layer 16 on the surface of the stopper 14 over the cermet base element 15. This bonds chemically to the $Al_8Mo_3$ phase 12 on the surface of the molybdenum tube 6 and thus produces a permanent chemical bond. The three layers 12, 13 and 16 from the intermetallic phases together form the novel intermetallic interfacial gradient 20, which acts as an adhesive layer.

Figure 3:
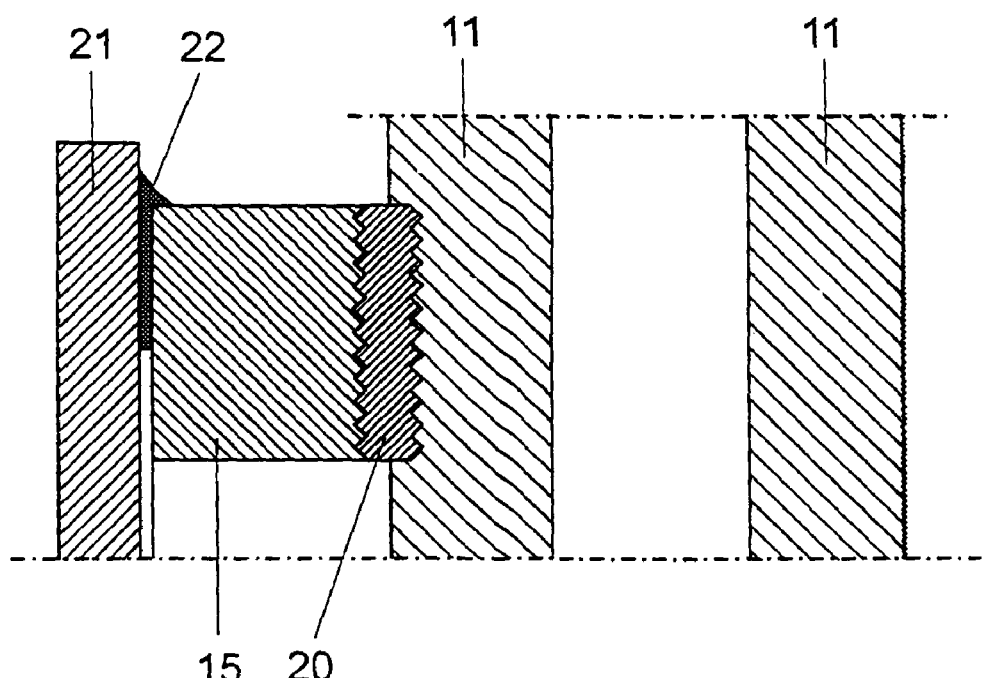
FIG. 3 shows a detail from FIG. 1, schematically.

In real terms, in this case no smooth interface is formed, but a gradual gradient is formed, with these layers merging with one another smoothly. In particular, the interface with the same concentration fluctuates suddenly, with the result that a narrow toothed formation is produced, as is illustrated schematically in FIG. 3. The adhesive layer is now treated, under heat treatment, with an oxygen-containing protective gas, the adhesive layer in the ideal case being converted completely into a cermet consisting of Mo and $Al_2O_3$. In general, however, a residual amount of the original layer sequence remains in the adhesive layer as a result of incomplete conversion, i.e. part of the $Al_8Mo_3$ phase and/or the $AlMo_3$ phase survives.

Then, this system is inserted into the end 21 of the discharge vessel consisting of $Al_2O_3$(PCA) and sealing is achieved there between the end 21 and the stopper 15 by means of glass solder 22. In this case, the leadthrough is represented as an Mo tube 11, to which the stopper 15 is connected on the outside via the novel adhesive layer 20. The toothed formation is in this case not illustrated to scale.

The leadthrough in this case does not need to completely consist of molybdenum. It is sufficient if it consists partially of molybdenum, in the part to be sealed or the surface of this part. For example, a rear part of the leadthrough can consist of niobium, as is known per se, or the leadthrough can have a core consisting of a different material, as is likewise known per se.

The invention claimed is:

1. A method for producing a joint between a stopper and a Mo part of a leadthrough of a metal halide lamp, the method comprising:
   via an alitization process, diffusing Al into the surface of the Mo part, wherein the Al is reactively bonded to Mo to form a compound of Mo and Al;
   inserting the alitized Mo part into the stopper;
   supplying a protective gas;
   heat treating the alitized Mo part and the stopper in the protective gas, wherein the surface of the stopper which faces the Mo part reacts, with first an intermetallic interfacial gradient being formed which is partially or completely converted into a cermet consisting of Mo and $Al_2O_3$ as a function of the procedure for the heat treatment.

2. The method of claim 1, wherein supplying the protective gas comprises supplying a protective gas comprising Ar and/or $N_2$.

3. The method of claim 2, wherein supplying the protective gas comprising Ar and/or $N_2$ comprises supplying the protective gas comprising Ar and/or $N_2$ and a low proportion of oxygen.

4. The method of claim 3, wherein the supply of the protective gas comprising Ar and/or $N_2$ comprises supply of the protective gas comprising Ar and/or $N_2$ and a low proportion of oxygen, the oxygen with a partial pressure of at most 200 ppm.

5. The method of claim 4, wherein heat treating the alitized Mo part and the stopper in the protective gas comprises heat treating within a range of 1500 to 2000° C. the alitized Mo part and the stopper in the protective gas.

6. A metal halide lamp comprising
   a light-permeable ceramic discharge vessel;
   at least one leadthrough that bears an electrode and protrudes into the discharge vessel through an opening of a discharge vessel end, the at least one leadthrough comprising a Mo part;
   a stopper consisting essentially of a Mo-$Al_2O_3$ cermet, the at least one leadthrough being sealed off in the opening of the discharge vessel end by the stopper;
   an adhesive layer comprising Al and Mo, wherein the Mo part of the leadthrough and the stopper are joined via the adhesive layer, the adhesive layer partially comprises an intermetallic layer with a gradient comprising, when viewed transversely with respect to the lamp axis, a central zone comprising predominantly $Al_8Mo_3$, and two adjoining outer zones comprising less Al than Mo.

7. The metal halide lamp of claim 6, wherein the Mo part is a tube.

8. The metal halide lamp of claim 6, wherein the adhesive layer is configured such that the adhesive layer comprises a Mo—$Al_2O_3$ cermet after a heat treatment of 1500 to 2000° C.

9. The metal halide lamp of claim 6, wherein the stopper is joined to the discharge vessel end by means of glass solder or melt ceramic.

10. A metal halide lamp comprising
a light-permeable ceramic discharge vessel;
at least one leadthrough that bears an electrode and protrudes into the discharge vessel through an opening of a discharge vessel end, the at least one leadthrough comprising a Mo part;
a stopper consisting essentially of a Mo—$Al_2O_3$ cermet, the at least one leadthrough being sealed off in the opening of the discharge vessel end by the stopper;
an adhesive layer comprising Al and Mo, wherein the Mo part of the leadthrough and the stopper are joined via the adhesive layer, the adhesive layer partially comprises an intermetallic layer with a gradient comprising, when viewed transversely with respect to the lamp axis, a central zone comprising more Al in relation to Mo, and two adjoining outer zones comprising predominantly $AlMo_3$.

11. The metal halide lamp of claim 10, wherein the Mo part is a tube.

12. The metal halide lamp of claim 10, wherein the adhesive layer is configured such that the adhesive layer comprises a Mo—$Al_2O_3$ cermet after a heat treatment of 1500 to 2000° C.

13. The metal halide lamp of claim 10, wherein the stopper is joined to the discharge vessel end by means of glass solder or melt ceramic.

14. A metal halide lamp comprising
a light-permeable ceramic discharge vessel;
at least one leadthrough that bears an electrode and protrudes into the discharge vessel through an opening of a discharge vessel end, the at least one leadthrough comprising a Mo part;
a stopper consisting essentially of a Mo—$Al_2O_3$ cermet, the at least one leadthrough being sealed off in the opening of the discharge vessel end by the stopper;
an adhesive layer comprising Al and Mo, wherein the Mo part of the leadthrough and the stopper are joined via the adhesive layer, the adhesive layer partially comprises an intermetallic layer with a gradient comprising, when viewed transversely with respect to the lamp axis, a central zone comprising predominantly $Al_8Mo_3$, and two adjoining outer zones comprising predominantly $AlMo_3$, wherein the adhesive layer is configured such that the adhesive layer comprises a Mo-$Al_2O_3$ cermet after a heat treatment of 1500 to 2000° C.

* * * * *